(12) United States Patent
Nelson et al.

(10) Patent No.: US 7,655,275 B2
(45) Date of Patent: Feb. 2, 2010

(54) METHODS OF CONTROLLING FLOW

(75) Inventors: Curtis L. Nelson, Corvallis, OR (US);
Brian G. Risch, Corvallis, OR (US);
Charles C. Haluzak, Corvallis, OR
(US); Christopher C. Aschoff,
Corvallis, OR (US)

(73) Assignee: Hewlett-Packard Delopment Company, L.P., Houston, TX (US)

( * ) Notice: Subject to any disclaimer, the term of this patent is extended or adjusted under 35 U.S.C. 154(b) by 791 days.

(21) Appl. No.: 10/909,949

(22) Filed: Aug. 2, 2004

(65) Prior Publication Data

US 2006/0024504 A1    Feb. 2, 2006

(51) Int. Cl.
*B05D 3/06* (2006.01)
*B05D 3/10* (2006.01)
*B05D 5/10* (2006.01)

(52) U.S. Cl. .................. 427/299; 427/256; 427/261; 427/275; 427/300; 427/207.1

(58) Field of Classification Search ................. 427/261, 427/264, 271, 275, 299, 256, 300, 307
See application file for complete search history.

(56) References Cited

U.S. PATENT DOCUMENTS

| | | | |
|---|---|---|---|
| 4,550,326 A | 10/1985 | Allen et al. | |
| 4,555,062 A | 11/1985 | You | |
| 5,010,356 A | 4/1991 | Albinson | |
| 5,189,437 A | 2/1993 | Michaelis et al. | |
| 5,300,959 A | 4/1994 | McClelland et al. | |
| 5,305,015 A | 4/1994 | Schantz et al. | |
| 5,408,738 A | 4/1995 | Schantz et al. | |
| 5,417,897 A | 5/1995 | Asakawa et al. | |
| 5,434,606 A | 7/1995 | Hindagolla et al. | |
| 5,595,785 A | 1/1997 | Hindagolla et al. | |
| 5,598,193 A | 1/1997 | Halko et al. | |
| 5,633,664 A * | 5/1997 | Bayat | 347/47 |
| 5,748,216 A | 5/1998 | Scheffelin et al. | |
| 6,004,685 A | 12/1999 | Antoniadis et al. | |
| 6,120,131 A | 9/2000 | Murthy et al. | |
| 6,123,413 A | 9/2000 | Agarwal et al. | |
| 6,130,688 A | 10/2000 | Agarwal et al. | |
| 6,254,219 B1 | 7/2001 | Agarwal et al. | |
| 6,290,331 B1 | 9/2001 | Agarwal et al. | |
| 6,312,103 B1 | 11/2001 | Haluzak | |
| 6,318,843 B1 * | 11/2001 | Feder et al. | 347/47 |
| 6,331,055 B1 | 12/2001 | Miller et al. | |
| 6,371,596 B1 | 4/2002 | Maze et al. | |
| 6,459,462 B1 * | 10/2002 | Seraphim et al. | 349/73 |
| 6,645,569 B2 | 11/2003 | Cramer et al. | |
| 6,664,027 B2 | 12/2003 | Griffith et al. | |
| 6,699,728 B2 | 3/2004 | Guenther et al. | |
| 6,938,986 B2 * | 9/2005 | Macler et al. | 347/45 |
| 2005/0012197 A1 * | 1/2005 | Smith et al. | 257/687 |
| 2005/0173769 A1 * | 8/2005 | Michael et al. | 257/414 |

FOREIGN PATENT DOCUMENTS

| | | |
|---|---|---|
| EP | 0648803 A1 | 4/1995 |
| EP | 0694400 A2 | 1/1996 |
| EP | 0694400 B1 | 1/1996 |
| FR | 2747960 | 10/1997 |

(Continued)

OTHER PUBLICATIONS

Patent Abstracts of Japan, vol. 2000, No. 02, Feb. 29, 2000 & JP 11 310651 A (Hitachi Ltd), Nov. 9, 1999 abstract.

(Continued)

*Primary Examiner*—Timothy H Meeks
*Assistant Examiner*—Cachet I Sellman (57) ABSTRACT

A method of controlling flow includes treating a region of a surface to have a non-wettable surface characteristic or a wettable surface characteristic in the region.

18 Claims, 8 Drawing Sheets

FOREIGN PATENT DOCUMENTS

JP      2001188237 A * 7/2001
WO      WO 01/46987    6/2001

OTHER PUBLICATIONS

"Precision Industrial Ink Jet Printing Technology for Full Color PLED Display and TFT-LCD Manufacturing," Bennett et al., Litrex Corp, Pleasonton, CA 94588, Web:www.litrex.com.

"Precision Industrial Ink Jet Printing Technology for Full Color PLED Display Manufacturing," Edwards et al., Litrex Corp, Pleasanton, CA 94588, Web: www.litrex.com.

"Encapsulant Materials for Filing Flip-Chip Attach," L. Gopalakrishnan et al., 1998 IEEE, Electronic Components and Technology Conference (pp. 1291-1297).

* cited by examiner

METHODS OF CONTROLLING FLOW

BACKGROUND

Fluid flow control is an issue for many applications. One application, for example, is control of adhesive flow in packaging of micro-electro-mechanical structures (MEMS). Another illustrative application in which adhesives are used is that of inkjet pen or cartridge assembly, where adhesives may be dispensed through needles. Other exemplary applications for which precise pattern control of fluid deposition on a surface is desirable include fabrication of biological or chemical sensors, ink-jet printed OLED displays, nanoparticle deposition for conductive traces, and organic or inorganic electrics. Good spatial control of deposition of the drops and later migration or diffusion may be useful in producing good quality electronic devices.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals.

Figure 1:
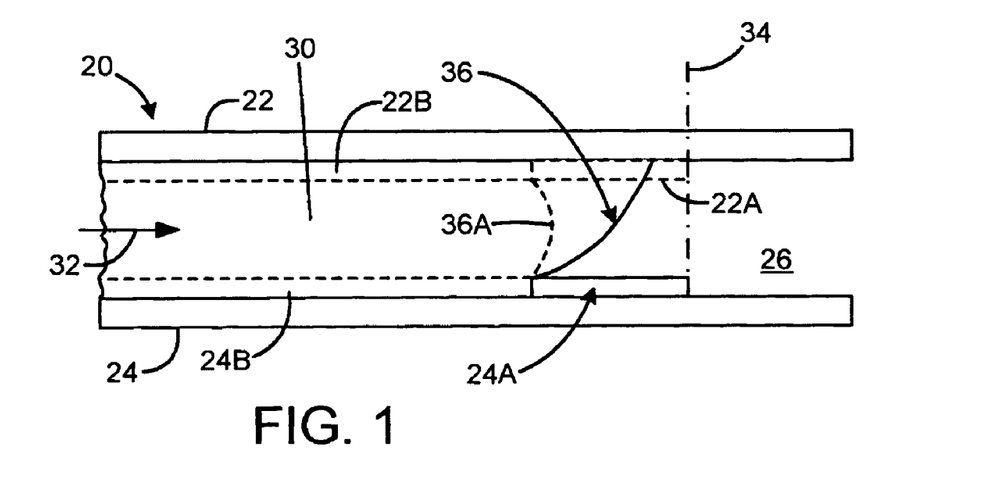
FIG. 1 shows an exemplary single-sided, pre-patterned, non-wetting surface treatment that prevents capillary flow beyond its boundary.

In one exemplary embodiment, surface modification, e.g. surface topography and surface area modification, is used to modify surface wettability to substantially stop adhesive flow at a specific desired location, or as a means to flow the adhesive farther into a capillary channel from the initial point of entry than would otherwise occur with no surface modification. FIG. 1 shows an exemplary pre-patterned, non-wetting surface treatment that reduces capillary flow beyond its boundary. In this embodiment, a parallel-wall structure 20 comprises upper wall 22 and lower wall 24 in a spaced relation, forming an open channel 26 between them. The channel height, in one exemplary embodiment, is on the order of 100 microns. A liquid adhesive 30, such as an epoxy novalac, a bisphenol epoxy, an acrylate, a polyurethane, or a bismalamide, is dispensed into the open channel in the direction indicated by the arrow 32. In some embodiments, the adhesive flows by capillary action, but in others it can be dispensed using a syringe, with the part moved on a stage under the syringe. It is desired that no adhesive should flow beyond the position indicated by phantom line 34. A patterned surface region 24A of the wall or substrate 24 is treated so that the region 24A is non-wetting, i.e. non-wetting or lacking affinity for water. In an exemplary embodiment, the surface region 24A is treated to modify its wettability characteristics. The wetting characteristics of a surface may be "wetting" or "non-wetting" and may also vary along a range within and between each category. "Wetting" generally means that the contact angle between the liquid and the substrate is small or zero. "Non-wetting" means that the contact angle between the liquid and the substrate is greater than 90°. The higher the contact angle the more non-wetting the liquid is to the surface. Fluid tends to bead on non-wetting surfaces and spread over wetting surfaces. In an exemplary embodiment, the surface treatment is a laser treatment, although other surface treatment techniques can alternatively be employed.

For clarity in illustration, region 24A is shown in FIG. 1 as an area having some thickness above the surface of wall 24; however, it is to be understood that the patterned surface region 24A may alternatively be the same height, or even lower, than the surrounding areas. In one exemplary embodiment, the surface treatment has a depth on the order of 1 micron. The liquid adhesive 30 is repelled by the surface region 24A, and this in turn tends to cause the liquid flow to stop, with a final adhesive surface indicated by line 36. The surface treatment thus enables the free surface boundary to be selected, i.e. at the perimeter of the surface region 24A. The adhesive can be cured subsequently to a liquid state.

A second non-wetting region adjacent to region 24A but on the opposite wall 22 would increase the likelihood of discrete capillary adhesive flow stoppage. An exemplary second non-wetting region is indicated in phantom as 22A in FIG. 1, with a corresponding exemplary resulting adhesive surface boundary 36A shown in phantom.

Further, wetting surface treatments can be used to "propel" or drawn the adhesive 30 further into long and/or flow constrictive geometries. In this case, a surface treated region 22A and/or 24A (shown in phantom in FIG. 1) can be surface treated to be a wetting surface or surfaces. Alternatively, surface region 22B and/or 24B can be a wetting surface, or treated to have a wetting characteristic, and region 22A and/or 24A treated to have a non-wetting characteristic. This will draw the liquid 30 along the channel to the region 22A and 24A, where it is stopped by the non-wetting region 22A and/or 24A.

Suitable surface treatment techniques can be used for each surface that is to be treated. Exemplary techniques, including chemical vapor deposition, plasma and/or wet etches, chemical (patterned self-assembled monolayers (SAMs), plasma ashing and laser surface modifications, can be employed to provide the desired surface properties of wetting or non-wetting, depending on the material to be provided with increased adhesive flow control. One exemplary laser surface treatment is done by laser ablation. Exemplary substrates having surfaces to be treated include polyimides, plastics such as PEN or PET or Liquid Crystal Polymer (LCP), PTFE (Teflon™), titanium dioxide, silicon dioxide, parylene and glass.

Figure 2:
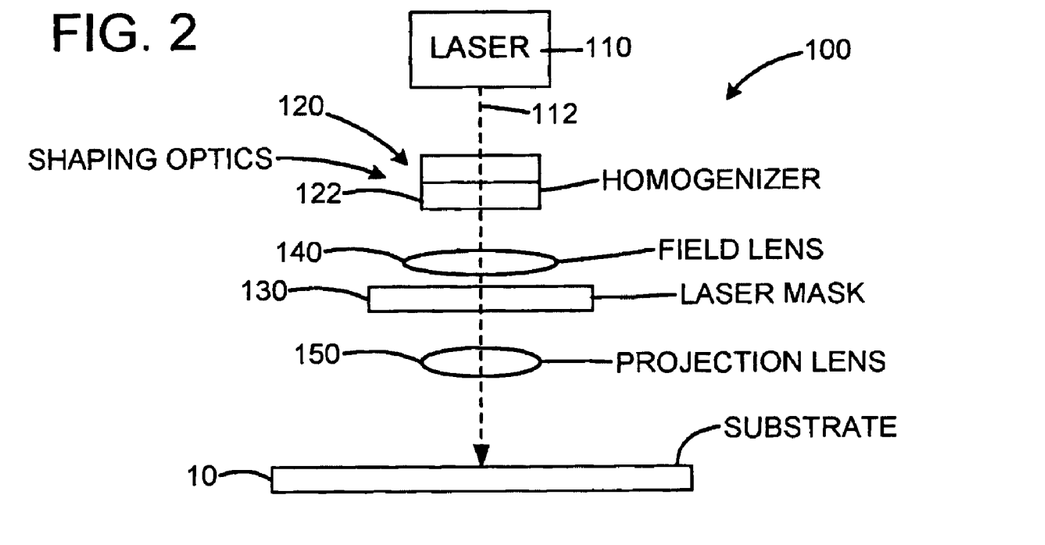
FIG. 2 schematically illustrates an exemplary embodiment of a laser ablation system for surface treating the surface of a substrate by laser ablation.

FIG. 2 schematically illustrates an exemplary embodiment of a laser ablation system 100 for surface treating the surface of a substrate by laser ablation. A laser 110 generates a laser beam 112; in one exemplary embodiment, the laser is a pulsed excimer laser operating at a wavelength of 248 nm. The beam 112 is passed through shaping optics 120 which includes a homogenizer 122. In this exemplary system, the shaping optics 120 includes a set of lenses that collimate the laser light and expand the size and shape of the laser beam to what is suitable for the particular application. The homogenizer 122 includes optical elements that make the intensity profile of the laser beam uniform. The beam is passed through the field lens 140, then through the laser mask 130. The image is then reduced in size by a projection lens 150 which also focuses the mask pattern onto the substrate 10. The beam width before the projection lens may be wider than the trace to be formed. An exemplary projection lens may have a 1-10× reduction in magnification, and focuses the beam to the desired trace width.

The laser mask 130 is designed to pattern certain areas on the substrate 10. FIG. 3A illustrates a simple mask 130A. The mask has opaque regions 130A-1 which at least substantially prevent the laser beam from passing through the mask and onto the substrate surface. Optically clear regions 130A-2 of the mask allow the laser beam to pass through onto the substrate surface.

One feature of an exemplary embodiment of a flow technique is that the surface modification may not have to be permanent. In an exemplary embodiment, the surface modification may only provide adhesive flow control assistance up until the point of adhesive curing, e.g. by thermal, UV or other curing technique. Beyond that point in time, the adhesive will essentially not flow again, and the surface modification's only additional function is to provide a good adhesive-to-surface bonding interface.

Figure 3:
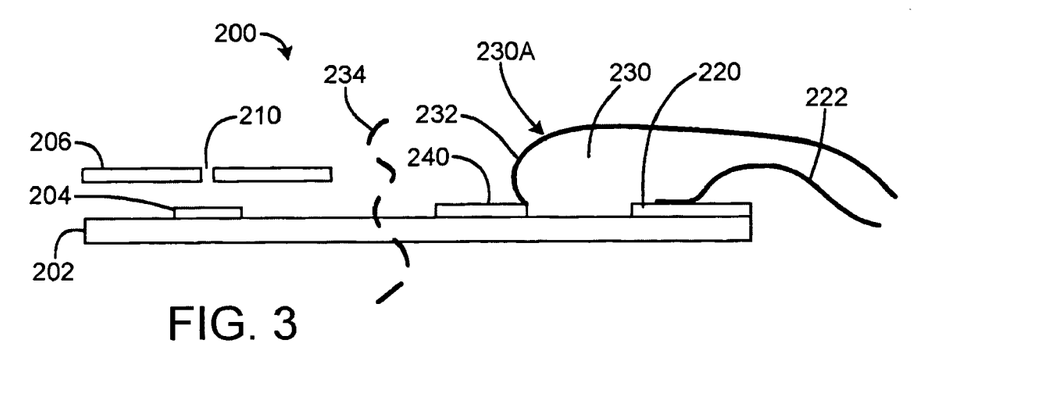
FIG. 3 illustrates an example of a surface-modified flow system.

An example of a surface-modified flow system is illustrated in FIG. 3. A printhead structure 200 is shown in a simplified, diagrammatic cross-sectional end view. The printhead structure includes an array of fluid drop generators each including in this exemplary embodiment a firing resistor and an inkjet nozzle. A substrate die 202 has formed thereon a thinfilm structure, which defines the resistors, including exemplary resistor 204. A barrier layer (not shown) may define walls of firing chambers above the resistors and bounded above by an orifice plate 206. Nozzles including exemplary nozzle 210 are formed in the orifice plate 206. Also formed on the surface of the substrate 202 are bond pads, including bond pad 220. The printhead structure of FIG. 3 includes an exemplary resistor nozzle and bond pad column comprising resistor 204, nozzle 210 and bond pad 220. A bond wire 222 connects bond pad 220 to printhead circuitry (not shown).

To protect the bond wires 222, a bead 230 of encapsulation adhesive is dispensed in liquid form over the wires 222. The encapsulation adhesive is to encapsulate the bond pads, but not creep into the nozzles, e.g. advancing no further than dashed boundary 234 toward the resistor-nozzle column. It is also desired that the adhesive bead 230 have a specific height, defined by the encapsulant final free-surface 230A for proper nozzle wiping routines in the printer system in which the printhead is used.

The advancement of the encapsulant bead toward the nozzles can be controlled by a patterned non-wetting surface treatment, e.g. at surface region 240. The difference in wettability between the two surfaces combined with the viscosity of the adhesive, which can be controlled by formulation and temperature, controls the height and shape of the adhesive bead. In this example, the region 240 is surface treated to have a non-wetting surface characteristic. In one embodiment the substrate surface is naturally wetting to the adhesive being dispensed. Alternatively or in addition, both wetting and non-wetting, patterned surface treatments can be used in conjunction to provide an encapsulation beam placement and height control. Also, the area where adhesive is desired may be treated with a treatment that increases wetting, and that area surrounded with a treatment that decreases wetting, thereby substantially confining the adhesive to the desired area. As adhesive is dispensed, the height of the adhesive bead in the z-direction increases because it is confined in the x-y direction.

Figure 4:
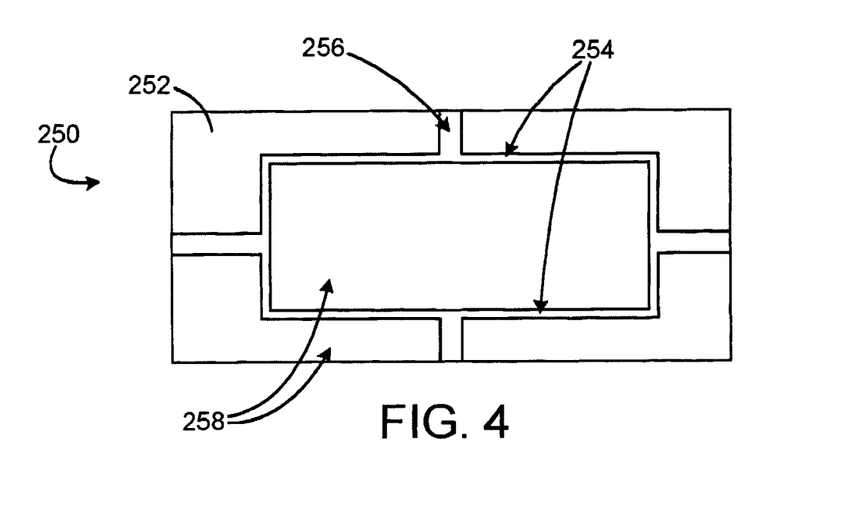
FIG. 4 illustrates a race-track surface modification for an exemplary parallel-plate configuration.

A race-track surface modification illustrated in FIG. 4 can be utilized in the parallel-plate configuration generally depicted in FIG. 1. Both "sides" or plate surfaces can be treated with the same pattern. Alternatively, the plate surfaces are not both patterned on both sides, since in many applications, treatment of one surface to form one fluidic "resistance patch" may be enough to stop the flow under nominal fluidic (viscosity/surface tension) conditions). Upper and lower plates are spaced apart, e.g. by a spacing in a range of 5 to greater than 100 microns, to provide a capillary wicking action with at least one of the facing surfaces having a patterned region treated to modify its surface properties. A differential surface property (such as "wetting" compared to the surface "field") is provided on both surfaces in a race-track shape, and the surfaces are aligned in a spaced relationship. Thus, as shown in the plan view of FIG. 4, an exemplary lower substrate 250 has a patterned race-track region 254 in a generally rectangular, closed configuration. The region 254 is formed by a relatively narrow strip which is surface treated to have a wetting, hydrophobic surface characteristic. The width of the strip may, in some embodiments, depend on fluid/surface interactions, and for adhesives, the curing regime. One exemplary width is 50 microns, with an exemplary width range of 5 microns to 1000 microns.

The portions 258 of the surface adjacent to the region 254 can be surface treated to have a non-wetting, hydrophilic surface characteristic.

In this exemplary embodiment, wetting entrance regions 256 are formed on the substrate surface from a substrate edge to the race-track region 254 to provide a wicking entrance for adhesive dispensed on one or both of the substrate surfaces. The fluidics provide for a "self-centering" effect during thermal curing of the adhesive. In one example of a self-centering effect, eutectic solder "solder-bumps" can be provided on one or more gold-patterned substrates and when the solder is melted, it "wets" to the adjacent gold pads or ring and not to the surrounding field, such that a strong self-centering occurs as capillary forces dominate, the bonding completes and the bond material solidifies. This "solder effect" for the dispensed adhesive can yield parts that are centroidally located within ±1.0 µm to each other. It also has the benefit of creating a ring seal that can be exploited to keep either liquid or gas, either "in" or "out" of the cavity surrounded by the racetrack region 254.

As an example of a laser surface treatment, in one experiment a 248 nm wavelength KrF excimer laser with an energy density of 100 mJ/cm2 and firing 25 pulses at a frequency of 200 Hz was used to roughen a polyimide substrate, resulting in a decreased wetting of the surface for L4 adhesive from Loctite Corporation. Using the same laser system but changing the energy density to 200 mJ/cm2 and firing just 5 pulses resulted in a increased wetting of the surface for the L4 adhesive from Loctite Corporation.

Extremely non-wetting nanotextured coatings with a surface topography with roughness on the nanometer scale is the basis of the "lotus effect." With surface roughness on the proper scale, drops cannot overcome the surface tension of the fluid to wet the surface.

Nano-textured, non-wetting surface pretreatment of a coating on a substrate can be combined with a laser processing step that "erases" the non-wetting properties of the coating. This combined process enables patterning a substrate's wettability in order to facilitate deposition of organic and inorganic materials on selected areas of a substrate, thereby allowing patterning for fabrication of microelectronic devices. In one exemplary embodiment, this process can be used for depositing organic light emitting diode (OLED) materials in individual pixels on a plastic display, and depositing organic dielectrics onto the appropriate areas of a TFT or other device.

This technique can be useful in situations in which precise pattern control of fluid deposition on a surface is desirable, including, without limitation, biological or chemical sensors, ink-jet printed OLED displays, nanoparticles deposited for conductive traces, organic or inorganic electronics and the like.

Low-cost electronic devices can be fabricated, wherein electronic materials are deposited onto a substrate using ink-jet fluid jetting technology. The materials are carried in solvents that form droplets on the surface, and the solvents are later removed. One obstacle in producing good quality electronic devices is achieving good spatial control of where the drops are deposited and also controlling later migration or diffusion of the drops and materials. As device dimensions become smaller, these difficulties increase.

Laser patterning can be used to increase the wettability of the surfaces; controlling the location of non-wetting surface areas may also be beneficial. In an exemplary embodiment, super-non-wetting nanostructured surfaces are combined with laser patterning to control wetting and non-wetting areas on a substrate, thereby allowing very high spatial definition, e.g. in low-cost electronic devices. Super-non-wetting surfaces can be considered those with a contact angle greater than 150 degrees. The patterning pre-treatment provides enhancement of inkjet-based low-cost electronics feature resolution and also for lower cost processing techniques such as simple dip processing.

Exemplary films that may be used for low cost electronics are Poly (ethyleneterephthalate) (PET), polyethylene naphthalate (PEN), and Kapton™ Polymide. These materials have inherent levels of affinity to the solvents used for low cost electronics, and can still be partially wet by the solvents used in low cost electronics. Such solvents include Tolulene, MEK (Methyl Ethyl Ketone), THF (Tetrahydrofuran), dichloromethane, and acetone. Laser patterning the surfaces increases the affinity of the electronic material containing solutions, thereby allowing preferential deposition. With microelectronic devices, in some embodiments, exclusion of the electronic materials from selected areas may be equally significant as selected deposition in desired areas. Laser patterning complements the use of non-wetting surfaces. A sheet of a non-wetting nanostructure substrate can be patterned with a laser to control wetting areas. The regions targeted by the laser will undergo surface modification to become wetting, leaving the rest of the substrate non-wetting.

Super-non-wetting nanotextured coatings may have a surface roughness characterized by a peak to peak period on the order of 100 nm or less, preferably 50 nm or less. Exemplary coatings are commercially available, e.g. NANO-CARE™ or NANO-PEL™ coatings from Nano-Tex, LLC. There are also super hydrophilic coatings that provide a surface that, for some applications, will spread water out to a few monolayers, which behaves as no water is present.

With surface roughness on the proper scale, drops cannot overcome the surface tension of the fluid to wet the surface. Essentially, the contact area is reduced to only very small areas of contact. Various mechanisms can be used to achieve this type of super-non-wetting coating. One approach is to apply a coating of $TiO_2$ (titanium dioxide) that has roughness on the nanometer scale described above. Since the structure of the coating is well below visible light wavelengths, no deterioration of optical properties is observed. Another successful application is to chemically treat the surface with solvents that roughen the surface, or to treat the surface with a coating that roughens the surface.

After the nano-textured nonwetting surface pretreatment is applied to the surface of a polyester film, such as PEN (poly-ethylenenapthalate) or PET (Poly-ethyleneterephthalate), a subsequent laser processing step modifies the surface roughness in certain areas, such as, by way of example only, the pixel areas for OLEDs. The laser treatment modifies the surface so that the roughness is no longer on the nanometer scale, but in the micrometer scale. This increase in roughness will allow the fluid to contact a greater surface area and will "erase" the effect of the non-wetting coating. Experiments have shown that although surface treatments that produce roughness on the nanometer scale result in non-wetting properties, the micron scale of roughness produced by laser pretreatment actually increases wetting behavior above the default value for some materials. Pre-treated contact angles on polyester films for deionized water may be between 45° and 55° whereas contact angles for treated films approaches 180° and may be more than 150°, almost totally non-wetting. This substantial variation in wettability creates high selectivity for adhesive application.

This laser treatment may use an excimer, YAG, YLF, or other laser. The pattern may be formed by using a laser mask or a scanning galvo head. A range of roughnesses can be achieved by varying the laser fluence, shot count, focus, etc.

After this treatment, the fluid (for example, organic or inorganic electronics materials suspended in a solvent) can be applied to the surface using, for example, a dip tank, spin coater, or ink jet printhead, and the suspended particles will be patterned on the area where the non-wetting coating has been modified without substantially being patterned on the area with the unmodified non-wetting coating.

This process can be used, for example, for depositing OLED materials in individual pixels on a plastic display, depositing organic dielectrics onto the correct areas of a TFT.

Figure 5A:
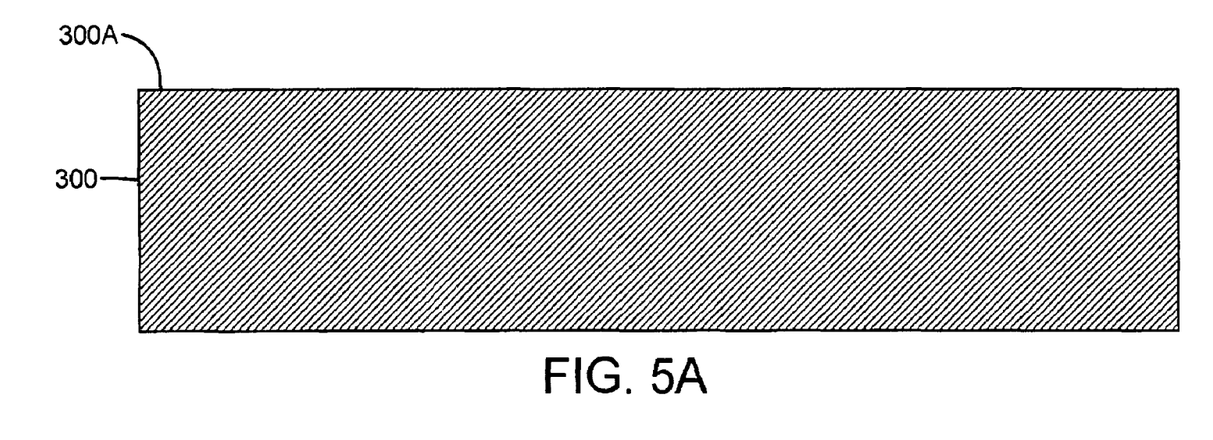
FIG. 5A is a side view illustrating an exemplary embodiment of a substrate which is to be coated before a fluid is dispensed.
Figure 5B:
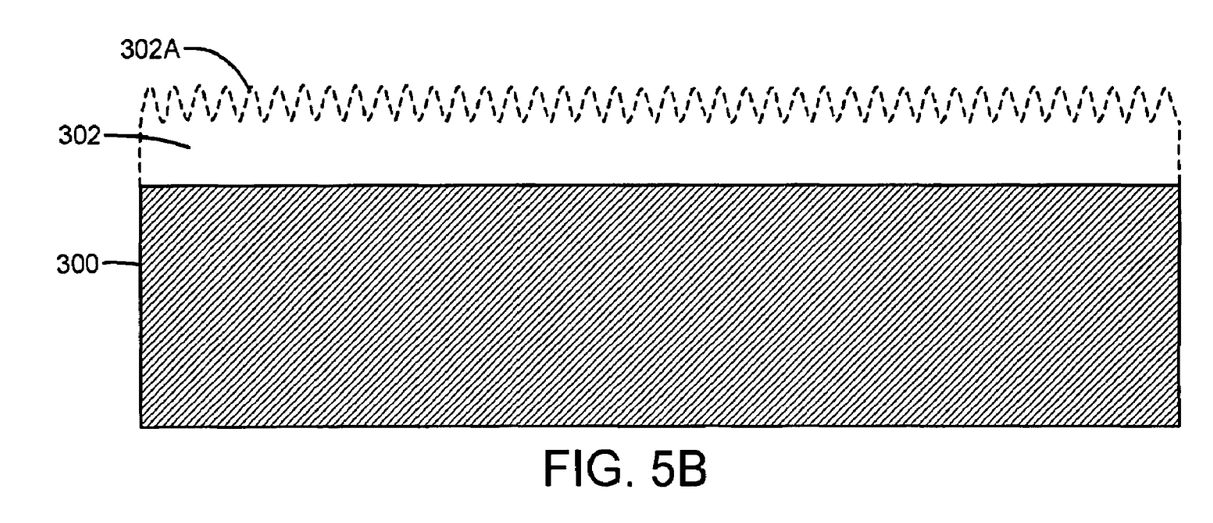
FIG. 5B shows the substrate after an exemplary non-wetting coating has been applied to a substrate surface.
Figure 5C:
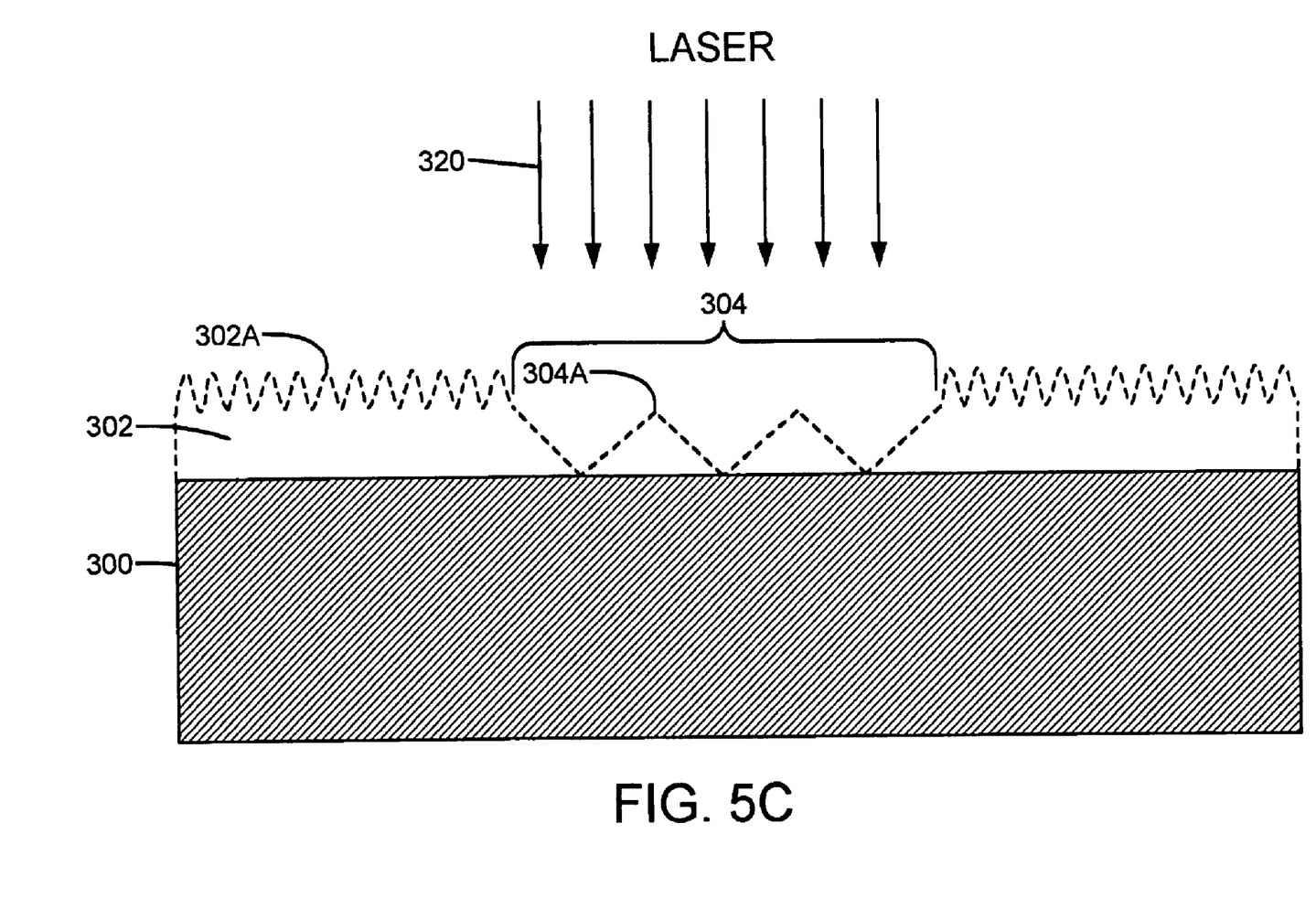
FIG. 5C diagrammatically depicts an exemplary laser treatment on a selected area of the coated substrate.

An exemplary embodiment of a surface treatment process is shown in FIGS. 5A-5F and 6. The process starts with a substrate, e.g. a PEN substrate 300, having an upper surface 300A (FIG. 5A). Then a super-non-wetting coating 302 (FIG. 5B), such as a solvent borne fluoropolymer, a solvent borne inorganic such as TiO2, or a sol-gel based coating, is applied to the surface 300A. In an exemplary embodiment, the coating 302 has a surface roughness profile in a nanometer range, e.g. wherein the spacing between surface peaks 302A is on the order of 1 nm.

Figure 5D:
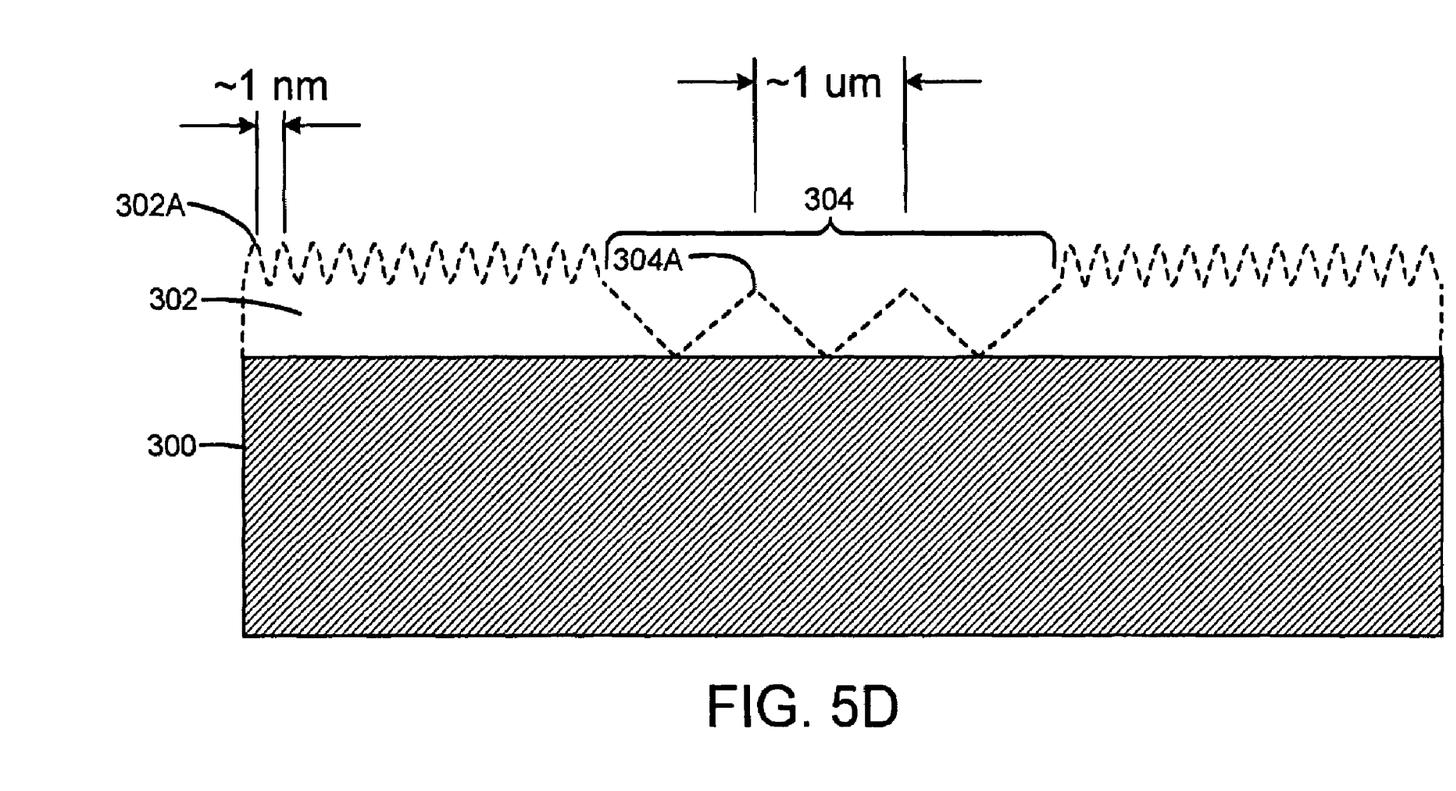
FIG. 5D shows the coated substrate after laser treatment to increase the scale of surface roughness in the selected area.

A patterned region, e.g. region 304, of the surface is treated by a laser beam 320 (FIG. 5C) generated by a laser ablation system. This treatment increases the scale of surface roughness within the treated region. For example, the surface roughness profile in the treated area, i.e. the spacing between adjacent surface peaks 304A, may be in the micrometer range, and the surface roughness profile outside the treated area remains in the nanometer range, as depicted in FIG. 5D.

Figure 5E:
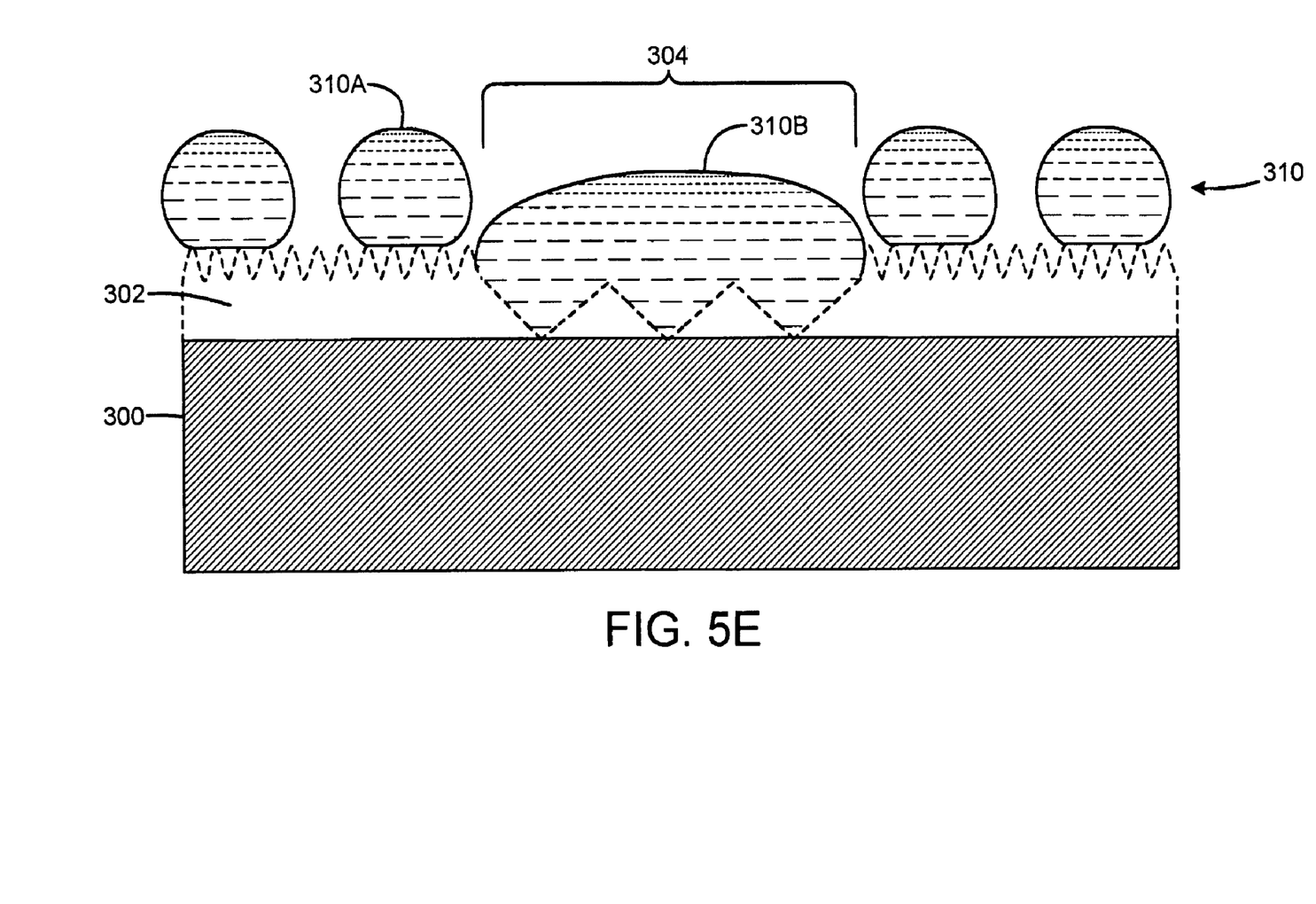
FIG. 5E shows the coated substrate after an exemplary fluid has been deposited on the substrate surface.
Figure 5F:
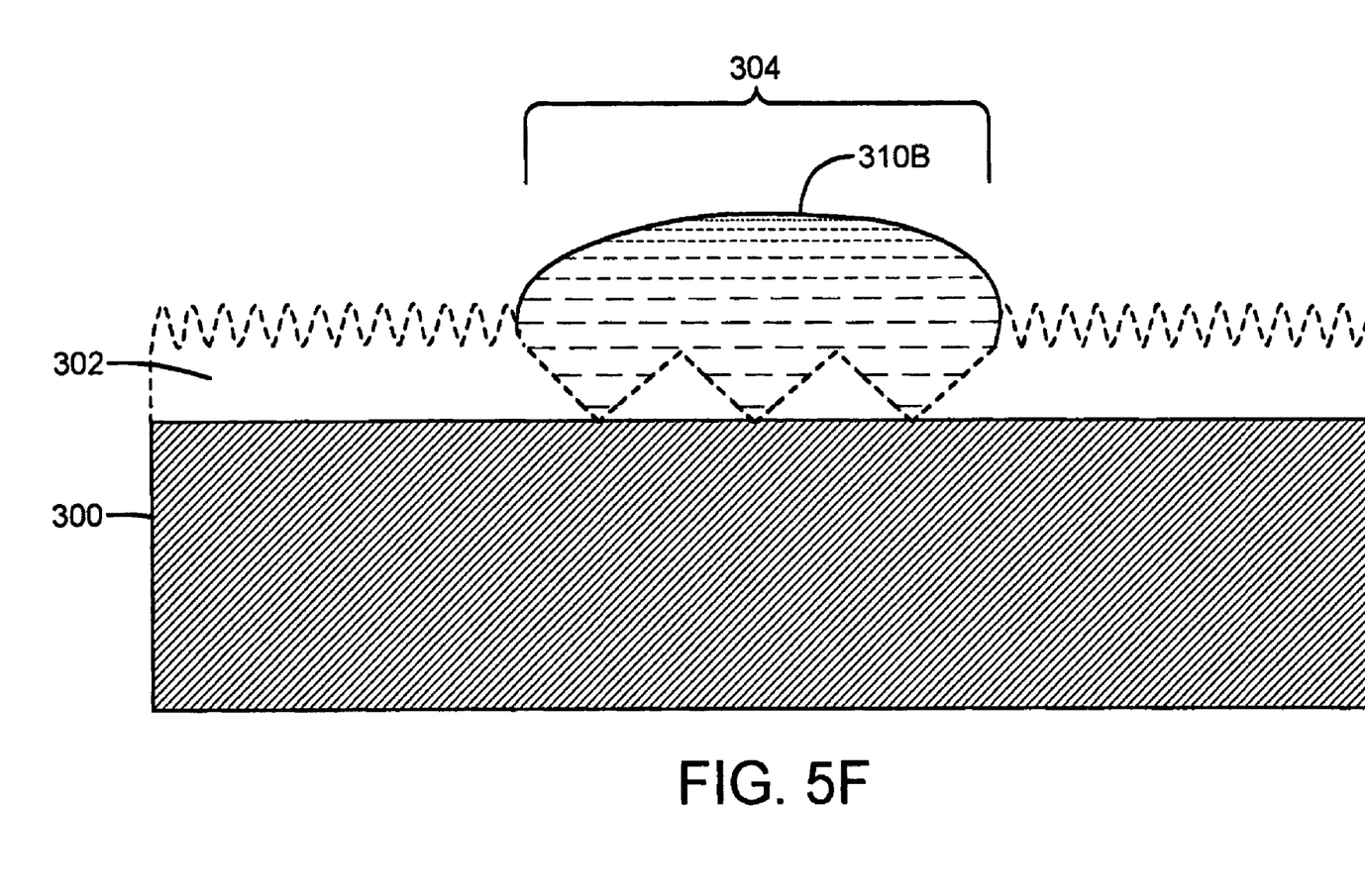
FIG. 5F shows the coated substrate after the fluid has been removed from untreated areas of the coated substrate.

A fluid 310 is deposited onto the surface of the substrate (FIG. 5E). This can be done in numerous ways, e.g. spraying or jetting using a thermal inkjet printhead, to name only two. Due to the differential surface roughness profile, and the additional surface area contact in the treated region 310A, the surface in region 304 has greater wettability than the untreated areas. This fluid selectively flows to the desired areas since the contact angle on the nanotextured area is nearly zero and any fluid that does not immediately flow into the desired areas will bead up and roll along the surface until it coalesces with the remaining fluid. This facilitates removal of the fluid from unwanted areas, particularly the untreated surface regions, e.g. by spinning, heating, vibration, or some combination thereof, with fluid 310B remaining in the treated area as depicted in FIG. 5F. At this point, the substrate may be processed further, e.g. to remove solvents comprising the fluid, to form particles in the fluid into a solid, or the like.

Figure 6:
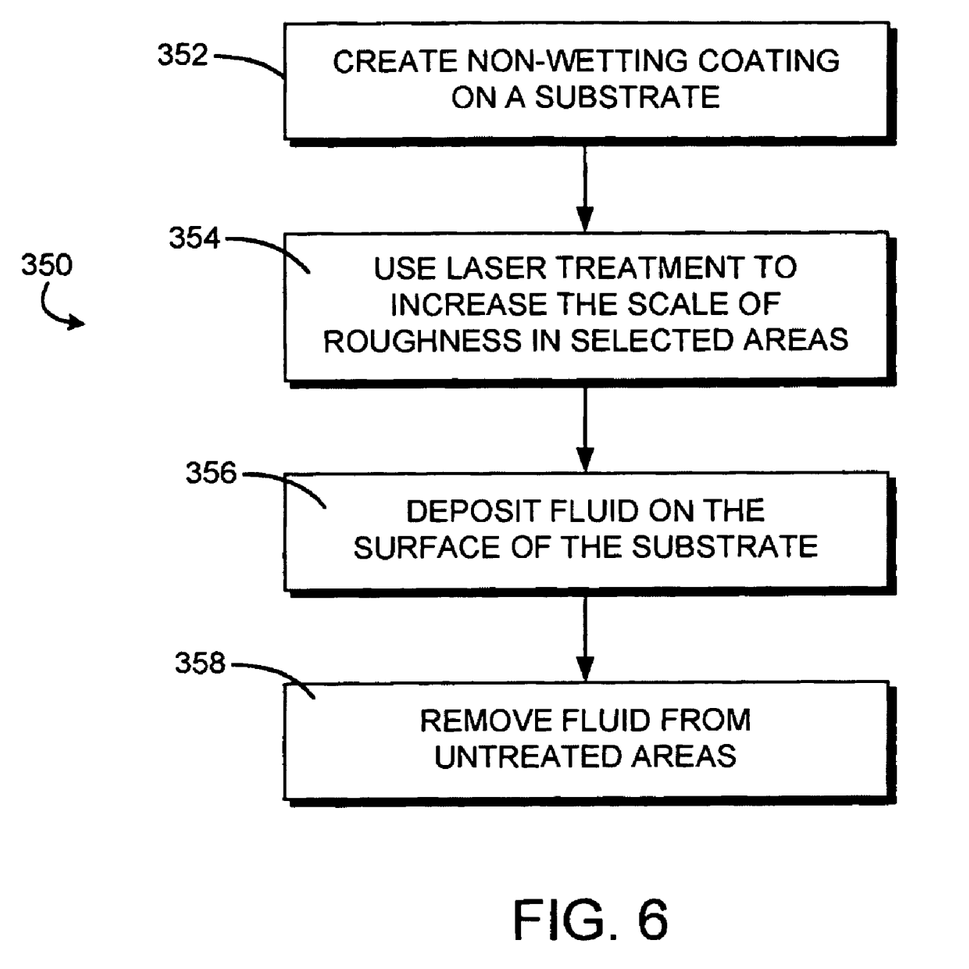
FIG. 6 is a simplified process flow diagram of an exemplary process for selectively applying a fluid to a surface as illustrated in FIGS. 5A-5F.

FIG. 6 is a simplified process flow diagram of an exemplary process 350 for selectively applying a fluid to a surface as illustrated in FIGS. 5A-5F. At step 352, a non-wettable nanotextured coating is created on a substrate surface, e.g. PEN. The coating is then subjected to a laser treatment to increase the scale of roughness of the coating surface in selected areas (354). A fluid is deposited on the coating surface at 356, and due to the increased surface area in the treated areas, the fluid surface is wettable in the treated areas. The fluid beads on the non-treated, non-wettable coating surface which is not treated, and does not bead on the wetted, treated areas. The fluid may then be removed from the untreated areas, at 358, e.g. by spinning, heating, vibration or some combination thereof.

The process provides an ability to selectively modify the wettability of a substrate in a desired pattern. The process enables work with a wider range of wettabilities between treated and untreated areas of a substrate. Use of laser treatment by itself yields less of a difference in wettability between treated and untreated areas then is achieved using the disclosed process. For example, toluene deposited on an indium tin oxide (ITO) film on glass has a contact angle of approximately 70 degrees. ITO is a conducting oxide, and is useful for printed displays because it is one of the best transparent conductors available. Laser treatment can reduce that contact angle to approximately 5 degrees (completely wetting). This gives a "wettability-delta" (change in contact angle between treated and untreated areas) of about 65 degrees. This may or may not be enough to confine the fluid to just the patterned areas for certain applications. By using a process as described herein, the wettability-delta can be substantially favorably changed by increasing the contact angle of the non-laser-treated state to 130 degrees or higher.

In combination with laser patterning, this process allows patterning of electronic devices with size scales below the level limited by normal drop-size limitations imposed by the current ranges of interfacial tensions and surface energies.

This increased range of wettability states and device spatial resolution may, for example, be used in a biological or chemical sensor to cause the test material to settle on top of the sensor region, or to cause ink-jet printed OLED materials to land in the pixel areas, to form a consistent trace width for nanoparticles deposited as conductive traces, and to pattern inorganic dielectrics in the gate region of a TFT.

Although the foregoing has been a description and illustration of specific embodiments of the invention, various modifications and changes thereto can be made by persons skilled in the art without departing from the scope and spirit of the invention as defined by the following claims.

What is claimed is:

1. A method of controlling liquid flow into a channel comprising first and second spaced opposed surfaces, comprising:
   treating a first region of the first surface to have a wettable surface characteristic;
   treating a first region of the second surface to have a wettable surface characteristic, the first region of the second surface being opposite the first region of the first surface;
   treating a second region of the second surface, adjacent the first region of the second surface, to have a non-wettable surface characteristic;
   dispensing the liquid into said channel between the first surface and the second surface; and
   controlling flow of the liquid within said channel, including repelling the liquid in the second region of the second surface by the non-wettable surface characteristic.

2. The method of claim 1, wherein said liquid is a liquid adhesive.

3. The method of claim 2, further comprising:
   curing the liquid adhesive to a solid state.

4. The method of claim 2, wherein the liquid adhesive is one of epoxy novalac, a bisphenol epoxy, an acrylate, a polyurethane, or a bismalamide.

5. The method of claim 1, further comprising:
   treating a second region of the first surface, adjacent the first region of the first surface, to have a non-wettable surface characteristic, the second region of the first surface being opposite the second region of the second surface,
   wherein controlling flow of the liquid includes repelling the liquid in the second region of the first surface by the non-wettable surface characteristic.

6. The method of claim 1, wherein said treating the first region of the first surface comprises laser ablating the first region of the first surface.

7. The method of claim 1, wherein said treating the first region of the second surface comprises laser ablating the first region of the second surface.

8. The method of claim 1, wherein the treated region of the first and second surfaces comprises a racetrack-shaped region.

9. The method of claim 8, wherein the treated region of the first and second surfaces further comprises an input region connected to the racetrack-shaped region.

10. The method of claim 1, wherein the treated region of the first and second surfaces circumscribes an interior region between the first and second surfaces.

11. A method of controlling flow of a liquid adhesive, comprising:
    treating a patterned region of a surface to have a non-wettable surface characteristic or a wettable surface characteristic in said patterned region;
    dispensing the liquid adhesive onto the surface, wherein said dispensing the liquid adhesive onto the surface covers one or more contacts as a liquid encapsulant, the patterned region forming a flow control surface for the liquid encapsulant, wherein said contact is a bond pad; and
    attaching a wire to the bond pad prior to dispensing the liquid encapsulant;
    wherein said dispensing the liquid encapsulant includes covering the wire with the liquid encapsulant.

12. The method of claim 1, wherein dispensing the liquid comprises dispensing the liquid into said channel from an end of said channel having the first region of the first surface and the first region of the second surface.

13. The method of claim 12, wherein controlling flow of the liquid includes controlling flow of the liquid to a boundary at or within the second region of the second surface.

14. The method of claim 11, further comprising:
curing the liquid encapsulant to a solid state.

15. The method of claim 11, wherein said treating the patterned region of the surface comprises treating the patterned region to have the non-wettable surface characteristic, wherein the liquid encapsulant is repelled from flowing onto the patterned region by the non-wettable surface characteristic.

16. The method of claim 11, wherein said treating the patterned region of the surface comprises treating the patterned region to have the wettable surface characteristic, thereby enhancing flow of the liquid encapsulant onto the patterned region.

17. The method of claim 11, wherein said treating the patterned region of the surface comprises laser ablating the patterned region of the surface.

18. The method of claim 11, wherein the liquid encapsulant is one of epoxy novalac, a bisphenol epoxy, an acrylate, a polyurethane, or a bismalamide.

* * * * *

UNITED STATES PATENT AND TRADEMARK OFFICE
CERTIFICATE OF CORRECTION

PATENT NO. : 7,655,275 B2 Page 1 of 1
APPLICATION NO. : 10/909949
DATED : February 2, 2010
INVENTOR(S) : Curtis L. Nelson et al.

It is certified that error appears in the above-identified patent and that said Letters Patent is hereby corrected as shown below:

On the Title page, in Item (73), Assignee, in column 1, line 1,
delete "Delopment" and insert -- Development --, therefor.

Signed and Sealed this

Thirteenth Day of July, 2010

David J. Kappos
*Director of the United States Patent and Trademark Office*